United States Patent [19]
Koivunen

[11] Patent Number: 5,588,928
[45] Date of Patent: Dec. 31, 1996

[54] SELF-SYNCHRONIZING BRAKE BAND ACTUATING SYSTEM FOR AUTOMATIC CHANGE SPEED TRANSMISSIONS

[76] Inventor: Erkki A. Koivunen, 18260 Blue Heron Pointe Dr., Northville, Mich. 48167

[21] Appl. No.: 436,756

[22] Filed: May 8, 1995

[51] Int. Cl.⁶ .................................................. F16H 63/30
[52] U.S. Cl. .................................... 475/126; 475/128
[58] Field of Search ............................... 475/116, 126, 475/128; 188/77 R

[56] References Cited

U.S. PATENT DOCUMENTS

| | | | |
|---|---|---|---|
| 2,409,506 | 10/1946 | McFarland | 475/126 |
| 3,251,246 | 5/1966 | Foerster et al. | 475/126 |
| 4,217,974 | 8/1980 | Holcomb, Jr. | 188/77 R |
| 4,360,092 | 11/1982 | Müller et al. | 192/12 C |
| 4,604,914 | 8/1986 | Fisher | 74/688 |
| 4,930,373 | 6/1990 | Nakawaki et al. | 475/128 |
| 5,031,746 | 7/1991 | Koivunen | 192/85 AA |
| 5,106,348 | 4/1992 | Koivunen | 475/126 |
| 5,281,190 | 1/1994 | Koivunen | 475/116 |

Primary Examiner—Dirk Wright
Attorney, Agent, or Firm—Charles R. White

[57] ABSTRACT

A friction brake band actuating system for automatic transmissions operative for obtaining smooth self-synchronized freewheeler type shifts without the use of one-way roller or sprag clutches. The band functions normally like a conventional brake band providing engine braking while the vehicle is coasting. For both upshifting and downshifting, the actuating system is staged in a one-way mode at the beginning of the shift event. In the one-way mode the self-synchronizing brake band utilizes the band reaction force to regulate a common pressure, which is acting on the apply piston and also on a reaction piston provided for counteracting the force at the band anchor end. The resulting torque capacity of the band varies in direct relationship with the torque the band is transmitting. Consequently, when at the torque reversal point the transmitted torque drops to zero, the torque capacity of the band also drops to a near-zero value and the band becomes automatically released and the brake drum free to turn in opposite direction. The band is fully disengaged after the shift is completed to eliminate the remaining slight residual drag. A bi-directional version of the self-synchronizing band is also included.

13 Claims, 6 Drawing Sheets

SELF-SYNCHRONIZING BRAKE BAND ACTUATING SYSTEM FOR AUTOMATIC CHANGE SPEED TRANSMISSIONS

FIELD OF INVENTION

This invention relates to automatic change gear transmissions and particularly to a new and improved band type friction holding device and its actuating system, providing smooth self-synchronized power-on upshifts and downshifts for gear ratio changes.

BACKGROUND OF INVENTION

In pursuit of a best possible shift quality, most modern automatic transmissions use one-way clutches, often in series with a multi-plate clutch for establishment of intermediate transmission gear ratios. Such arrangements inherently offer a superior shift quality with the least complicated control system. However, such designs often require yet another friction device, parallel to the one-way device, for coast braking, thereby making the transmission larger, heavier and costlier. For this reason, many current transmissions employ friction brake bands as grounding devices in place of one-way clutches.

Friction brake systems using bands are of compact construction and cause less parasitic losses than multiple plate clutches when running in a released state. They have an important functional advantage over multi-plate clutches in that the torque capacity of a friction brake band in one direction is much higher than in the opposite (coast) direction; about twice as high for a single wrap band and nearly four times for a double wrap band. This makes the calibration for a power-on band-to-clutch shifts, for instance, significantly easier than for a clutch-to-clutch shift. Yet, the obtained band-to-clutch shift quality is generally not as good and as consistent as can be obtained with a one-way way roller or sprag clutch. In general, poorly calibrated shifts, besides being uncomfortable to the driver and passengers, reduce the life of friction elements and can cause a costly premature failure of the transmission. The object of this invention is to provide a friction brake band system that makes shifts that are as smooth and precisely timed as the shifts obtained with one-way roller or sprag-type clutches.

The brake band system of this invention is based on the principle of making the device self-regulate its torque capacity in proportion to the torque that it carries. The friction band and control system of this invention based on such self-regulating principle will automatically release at the moment the transmitted torque reduces to zero and is about to change its direction, as happens during a gear shift from a lower ratio to a higher one. The underlying basic self-regulating principle used here is analogous to the principle used in my previous three self-synchronizing clutch inventions, which are covered in the following U.S. patents:

1. Multi-mode Clutch for Change-speed transmissions

U.S. Pat. No. 5,031,746 issued on Jul. 16, 1991.

2. Bi-directional Multi-mode Clutch for Change-speed Unit for Automatic Change Speed transmissions U.S. Pat. No. 5,106,348 issued on Apr. 21, 1992.

3. Gear-thrust Controlled Multi-mode Clutch for Power Transmissions

U.S. Pat. No. 5,281,190 issued on Jan. 25, 1994.

SUMMARY OF INVENTION

The present invention relates to automatic transmissions, and controls therefor, and more particularly, to the selective employment of friction bands as self-synchronizing braking device allowing "freewheeler" type power upshifts and downshifts. This is accomplished with a new and improved hydraulic actuating system requiring no changes in the transmission's cross-sectional components.

In a preferred embodiment the system incorporates a small piston acting on the apply end of the friction band, supplemented with a larger reaction piston acting on the reaction end of the band. These pistons are arranged so that the same pressurized fluid is acting simultaneously on both pistons and thrusting them in opposite directions. Pressurized oil is fed in the piston chambers through a fixed diameter orifice, and discharged to an exhaust port through a variable size opening controlled by the position of the reaction piston. This control function is incorporated in a forward extending guide rod attached to the reaction piston.

When the reaction piston is in its extreme retracted position the exhaust port in the control system is fully blocked. The exhaust port is opened and the flow area through the exhaust port progressively enlarged as the reaction piston advances forward. When the torque transmitted by the brake band decreases and the hydraulic forces acting on the reaction piston exceeds the band reaction force, the reaction piston moves axially thereby uncovering more of the exhaust port and lowering the pressure until an equilibrium of opposing forces acting on the reaction piston guide rod is reached.

In a contrary situation, where the reaction force exceeds the force from the pressure in the piston chamber, the reaction piston will shift to a position where the exhaust port flow becomes more restricted thereby increasing the chamber pressure until the forces are again in equilibrium.

The self-synchronized brake band of this invention can be set to operate in either in lock mode or in one-way mode. In the lock mode the band functions like a conventional friction band providing also engine braking when the vehicle is coasting. This eliminates an extra friction element used in many prior art transmissions for that purpose.

The one-way mode is used only for shifting. The transmission is placed in the one-way mode at the beginning of a shift and returned back to the lock mode soon after the shift is completed.

In the prior art, a switch cooperating with band anchor end senses the presence of a reactive force. During a power upshift to direct drive, the switch sends a signal to the control system to release the band thereby freeing the grounded member at the moment it wants to turn with other rotating components. If the band disengagement just starts at the moment it already should be free, the release will delayed and the shift will have a tied-up and sagging feel. The signal therefore must be anticipatory, necessitating precise calibration with results that may not be as consistent as desired.

In contrast, the self-synchronizing brake band featured in the present invention requires no switches and functions like a one-way clutch requiring little or no calibration while automatically providing smooth and consistent shifts.

This invention is particularly well suited for automatic transmissions with five or more forward gear ratios, which require a larger number of components rendering them larger and heavier and more expensive. Besides making these and all transmissions substantially smaller and lighter, the use of a friction bands of this invention has a beneficial effect on the transmission efficiency by reducing clutch drag and other parasitic losses.

DETAILED DESCRIPTION

Figure 1:
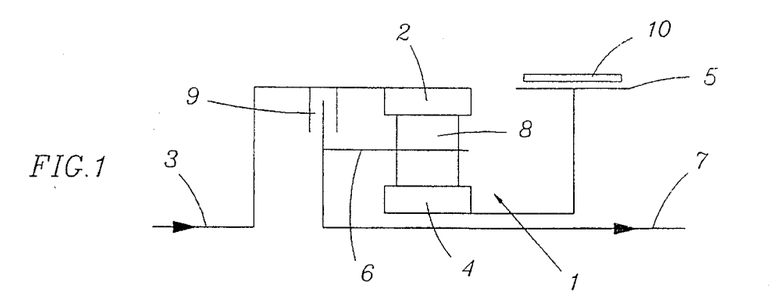
FIG. 1 is a schematic diagram for a simple two-speed transmission used here in explaining the invention.

A simple two-speed transmission shown in FIG. 1 is used to describe the involved gear and friction elements, and their functions during ratio change events.

The transmission consists of a simple planetary gear unit 1 having an annulus gear 2 coupled with input shaft 3, a sun gear 4 connected with brake drum 5, and a planet carrier 6 connected with output shaft 7. Planet gears 8 mesh with annulus gear 2 and sun gear 4. A self-synchronizing friction band 10 is engaged to hold the drum 5 and the sun gear 4 attached thereto stationary to set the transmission in low gear. The transmission is upshifted to direct drive by applying multi-plate clutch 9 and by disengaging the friction band 10 to lock the planetary gearset for unitary rotation.

Figure 2:
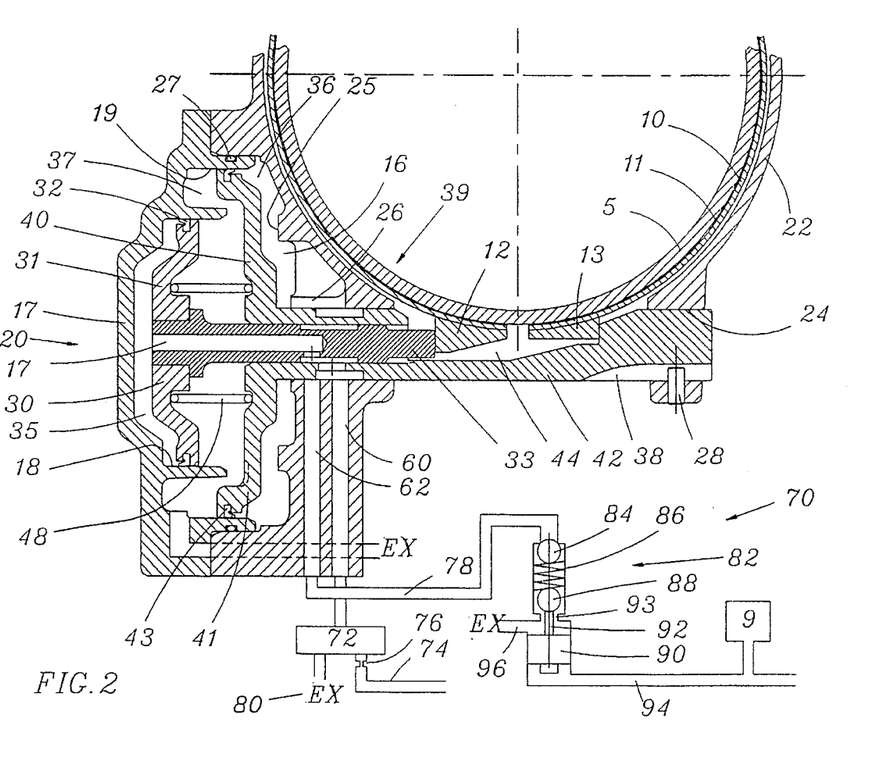
FIG. 2 is a sectional view along the transverse centerline of the band showing the band and the apply system of the first preferred embodiment of this invention.
Figure 3:
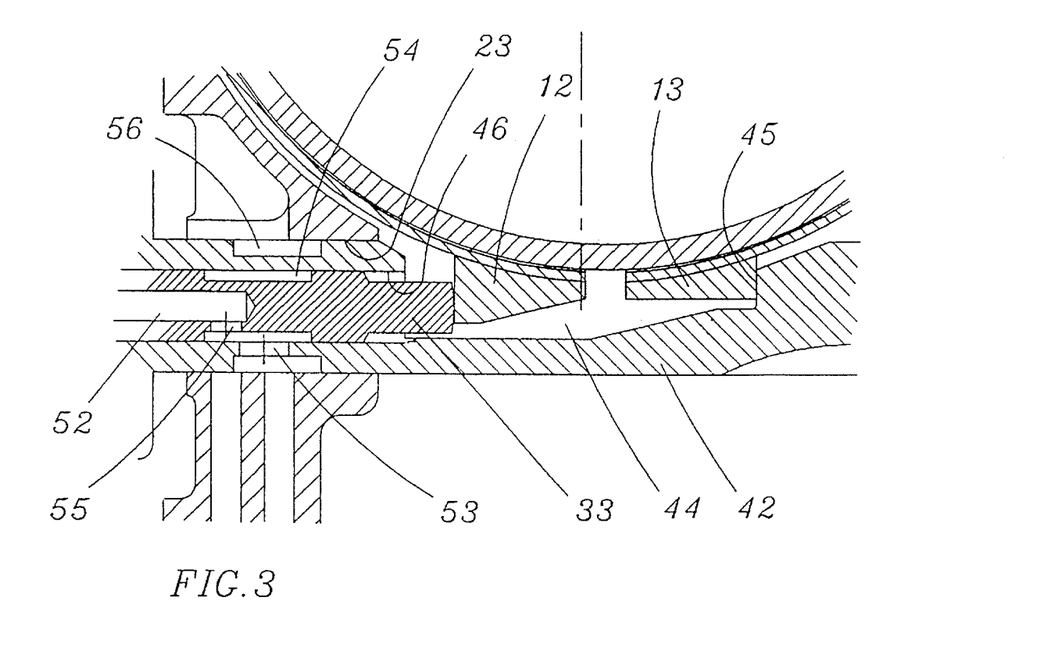
FIG. 3 is an enlarged detail of FIG. 2.

In the first preferred embodiment of this invention illustrated in FIG. 2 and FIG. 3 the friction band 10 encircling the drum 5 has friction lining 11 attached to its inner surface. The band 10 also has lugs secured to each end of the band; one lug 12 to the apply end and another lug 13 to the reaction end.

Generally, the friction band actuating system 20 is housed inside servo chamber 16 extending transversely in transmission case 22. The main components in the system are the apply piston 30 and the reaction piston 40. Both pistons are subjected to the same pressure regulated by an exhaust control valve 39, which is incorporated to the reaction piston guide rod 42, responding to the axial movement of the reaction piston 40, as will be further described later. Chamber 16 is enclosed by a servo cover 17, which includes cylindrical surfaces and oil passages for both pistons as well as an elastomer ring 27 for sealing purposes.

The apply piston assembly 30 consists of a disk-shaped piston 31 having a lip seal 32 installed on its outer periphery, and an apply pin 33 which is press fitted or otherwise securely fastened to piston 31. This piston operates inside a cylindrical wall 18 formed in the cover 17 and cooperates therewith to form a pressure chamber 35, which is pressure charged through an axial passage hole 52 in the apply pin 33 to effect engagement of the band 10.

The reaction piston 40 includes a disk-shaped piston body 41 with a lip seal 43 installed on its outer periphery and a rightward extending concentric guide rod 42 integral therewith. A slot 44, cut across the guide rod 42, forms an abutment 45 for the reaction end lug 13 of the friction band 10 for receiving the rightward directed reaction force therefrom. The guide rod 42 has a pass-through bore 46, extending therethrough to the cross slot 44, for the receiving the slidably fitted apply piston pin 33, which transmits forces from the apply piston 30 to the end lug 12 of the friction band 10.

Reaction piston 40 operates inside a cylindrical wall 19 also formed in the cover 17. When the chamber 36 formed between reaction piston 40 and transmission case 22 is pressurized, and the hydraulic force acting on the reaction piston 41 exceeds the band reaction force acting in the opposite direction, the reaction piston will move leftward thereby providing the action advantageously utilized by this invention to condition the exhaust control valve 39 to regulate the pressure forces acting on the apply and reaction pistons, which in turn controls the torque capacity of a self-synchronizing friction band.

Spring 48 acting in an exhausted chamber 37 formed between apply piston 30 and reaction piston 40 returns the apply piston to a released position. This same spring also thrusts the reaction piston 40 rightward against stop pad 25 inside the servo chamber 16.

The guide rod 42 of reaction piston 40 is positioned in the transmission case by a pair of equally sized concentric bores 23 and 24 and oriented by a pin 28 pressed in the case 22 and engaged in an axial slot 38 in the guide rod 42. To prevent oil leaking excessively a close sliding fit is provided between rod 42 and bore 23. For the same reason the clearance between the bore 46 central in the guide rod 42 and the apply piston pin 33 must also be kept small.

The schematic control system 70 for the self-synchronized friction band, shown in FIG. 2, includes a conventional shift valve 72 and a mode valve 82. The transmission line oil is supplied to the shift valve 72 via passage 74 and through a feed orifice 76. In the on-position the shift valve 72 directs the oil to the passage 60, which leads it to an annular slot 56 formed around reaction piston guide rod 42. As is shown in FIG. 3, the oil flow continues from slot 56 through a hole 53 in the guide rod 42 to an annular recess 54 on apply piston pin 33, and further through another radial hole 55 in the apply piston pin 33 to the central oil passage 52 leading to the chamber 35. The same oil is also fed to the chamber 36 directly from the annular slot 56 through a notch 26. The exhaust port 62, adjacent to the supply passage 60, is in communication with the mode valve 82 via passage 78.

When the band and its actuating system is shifted to the extreme rightward position with reaction piston 40 resting against surface 25, the annular slot 56 in the guide rod 52 is out of communication with exhaust port 62. Consequently, flow from the slot 56 is blocked and the chambers 35 and 36 become charged with full transmission line pressure. The transmission is then in low range drive.

The mode valve 82 combines two separate valve functions into one. The upper end is a ball pressure regulator, which has two components: ball 84 and the spring 86. This valve regulates a low (5–10 psi) pressure, a "tickle" pressure, needed when the system is in one-way mode. In the lower end of the valve is another ball valve 88, which is biased by the same spring 86. This valve is normally seated and blocks the flow downstream from the ball pressure regulator thereby nullifying its regulating action. The band in this lock or normal mode functions like a conventional transmission friction band. A small piston 90 placed below the ball 88 has in its upper end a small extension 92 protruding into a valve seat hole 93. Hydraulic pressure in passage 94 effecting an engagement of the clutch 9 for Hi range drive moves the piston 90 to its up-position unseating the ball 88 and thereby opening a connection from the ball regulator 84 to the exhaust port 96. This sets the system in the one-way mode.

In a released state, the apply piston 30 is pushed leftward against servo cover 17 and reaction piston 40 rightward against the stop surface 25 by the action of spring 48. With shift valve 72 in off-position, all chambers are open to the exhausted passage 80.

The band is applied initially with the control system in the normal locked mode by moving the shift valve 72 to an on-position. This allows pressurized oil in passage 74 flow through a fixed orifice 76 into passage 60, and further into chambers 35 and 36. The apply piston 30 resultantly moves forward against the lug 12 to start the engagement of friction band 10. The reaction force on the other end of the band is transmitted through lug 13 to the reaction piston 40, urging it in a rightward direction. The piston areas, however, are selected such that the hydraulic force on the reaction piston 40 always exceeds the band reaction force causing the reaction piston to move leftward against the servo cover 17.

Figure 4:
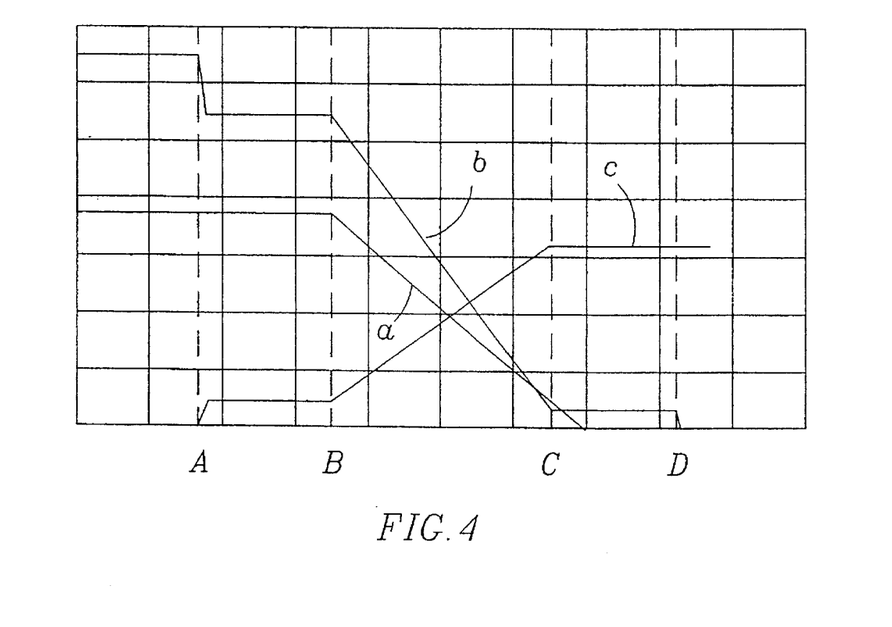
FIG. 4 is a chart graphically illustrating the interdependence between the torque and the torque capacity of a self-synchronizing band.

The events during a power upshift are described by referring to the FIG. 4, which shows a graphical presentation of torques during the shift. Prior to the start of shift the brake band 10 is engaged to hold the sun gear 4 stationary. The torque carried by the band is depicted by line "a". Line "b" shows the torque capacity of the band which is initially determined by the control system line pressure. The on-coming clutch 9 is at this time disengaged and carries no torque as shown by the line "c".

Upon a shift signal at point A, the piston chamber of the clutch 9 is pressurized. Pressure oil charging clutch 9 enters also in passage 94 leading to mode valve 82 and displaces ball 88 from its seat which sets the brake band in the one-way mode. With the exhaust port 62 now open to the exhaust through the mode valve 82, the oil discharged through this port lowers the pressure acting on both pistons 31, 40 until force equilibrium is restored, i.e. until the hydraulic piston force equals the band torque related reaction force.

At point B, after the piston in the clutch 9 has advanced forward to thrust against the clutch pack, the torque transmitted by the clutch 9 starts building up. Simultaneously, the torque carried by the off-coming friction band 10 decreases inversely to torque carried by the on-coming friction element i.e. clutch 9. During this period the regulated torque capacity of the friction band remains linearly related to the torque that the band is carrying.

At point C, which is the end of the torque phase of the shift, the torque transfer between the friction elements is completed and the torque carried by the band 10 is zero. Torque capacity of the band has converged simultaneously to a near-zero value, and drum 5 is free to rotate in opposite direction. At an elective point D, the shift valve 72 releases the band completely removing the drag torque present during the period from point C to point D. The resulting quality of the described self-synchronized shift will be consistently smooth and comparable to a shift off of a freewheeler.

Power downshifting from a higher gear ratio to a lower ratio requires that the self-synchronizing friction band is set in a one-way mode at the same time the off-coming clutch is signaled to start disengaging. In the case of the example transmission shown in FIG. 1 this means that the band 10 is ready to take over when the direct clutch 9 starts slipping.

The sequence of events that happen during a power downshift are as follows:

Initially, the multi-plate clutch 9 is engaged and the self-synchronizing band 10 in a released state with the band control system set for locked mode operation. The reaction piston 40 is in its rest position against the stop surface 25 and the apply piston is in a retracted position.

On the shift signal the shift valve 72 directs an orifice restricted oil flow from the supply line 74 to the feed port 60. The mode valve 82 is staged simultaneously in the one-way mode as has been described before. Both piston chambers 35 and 36 become charged with tickle pressure regulated by the ball regulator valve included in mode valve 82. This pressure is just high enough for the apply piston to overcome its return spring 48 and move forward to push the band into a light engagement with brake drum 5. The resulting drag torque is minimal since the band at this time is applied in the de-energized direction. Due to the presence of tickle pressure in chamber 36, the reaction piston 40 moves to the leftward end position maintaining a wide open exhaust control port 62. At the end of the torque transfer phase, when the off-coming clutch 9 clutch starts slipping, the drum 5 slows down and is about to change its direction of rotation. That changes the direction of the torque transmitted by the band, and causes the reaction piston move rightward thereby restricting the outflow from the piston chambers 35 and 36 through the exhaust port 62. Consequently, the torque capacity of the band, now working in energized direction, rises rapidly. This self-synchronous action clamps the band instantaneously, behaving much the same way as a one-way roller or sprag clutch would behave in the same situation. The system is reverted back to the normal any time soon after the shift is completed.

It should be noted that the timing is not at all critical. The only requirement is that the system is set in a one-way mode before the end of the torque phase. This applies to both power upshift and downshifts. Upon completion of the downshift the system is set back to the locked mode shortly after the shift is over to prevent the band from dragging unnecessarily against the brake drum.

In one-way mode, during a low gear coast, where the torque flow is in the opposite direction, the reaction piston 40 shifts to the leftward end position and opens the exhaust control port 62. This is inconsequential because in the normal lock mode of operation the exhaust flow is blocked at the mode valve 82 and the band stays applied providing the vehicle with low range engine braking.

In some applications, particularly in those with a double wrap band, the diameter of the reaction piston can become quite large. For those cases another embodiment, where two smaller piston arranged to work in tandem, may be more desirable.

Figure 5:
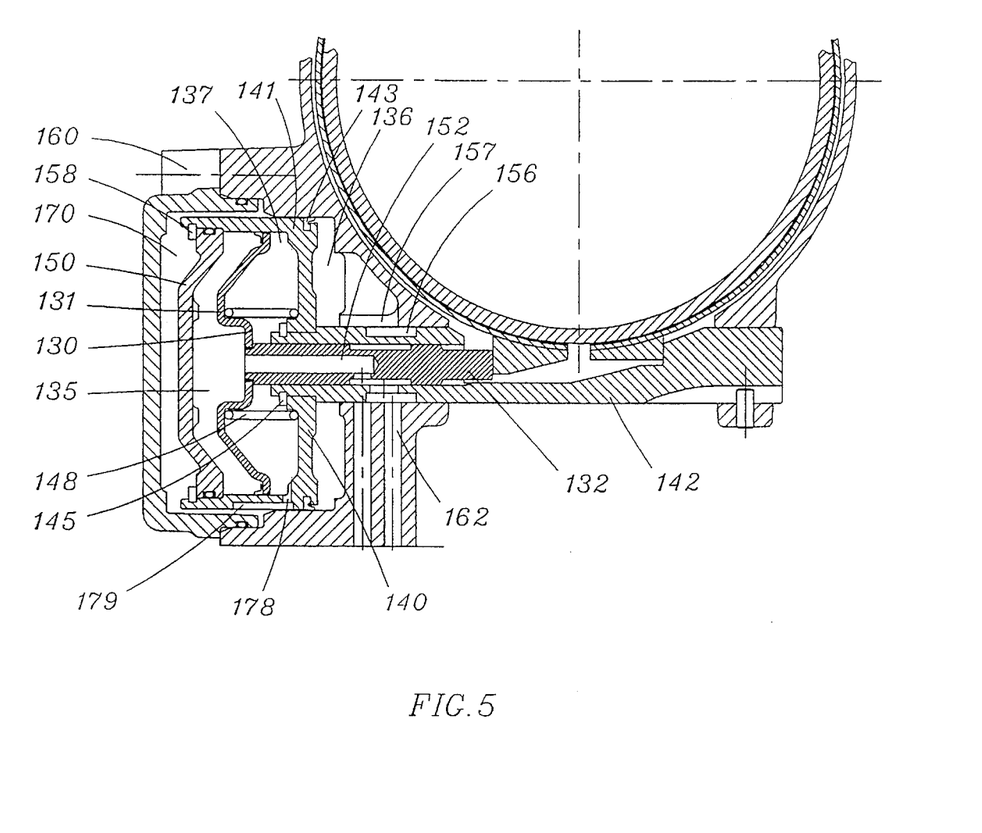
FIG. 5 is a sectional view similar to that of FIG. 2 but having a reaction piston with two smaller piston areas acting in tandem and illustrating a second preferred embodiment of the invention.

A cross-sectional view of such arrangement is shown in FIG. 5, which identifies parts that are different from those in the first preferred embodiment shown in FIG. 2, but not parts that remain the same.

A welded apply piston assembly 130 consists of a stamped piston 131 having an annular lip seal molded on its outer periphery, and of an apply pin 132. As shown, the apply piston 130 operates inside a reaction piston assembly 140, which surrounds it from all sides. Spring 148 acting between the pistons returns the apply piston 130 to its retracted position.

The reaction piston assembly 140 consists of a cup-shaped piston 141 with a lip seal 143 installed on it outer periphery. This assembly also includes a concentric guide rod 142, which is shown here as a separate attached part pressed into the reaction piston 141 and secured thereto with retaining ring 145. A reaction piston cover 150, which defines one end of the chamber where the apply piston 130 operates, has a rubber seal ring on its outer diameter and is held in place by retaining ring 158. A compression spring 148 disposed between the pistons thrusts the reaction piston in the rightward and the apply piston in the leftward direction.

Four chambers are formed between the pistons and the transmission case. An exhausted chamber 137 is formed between reaction piston 141 and apply piston 130, is connected through a hole 178 and slot 179 to an exhausted chamber 170 formed between the reaction piston and a servo cover 160. The pressurized chamber 135, formed between apply piston 131 and the reaction piston cover 150 is supplied with oil through central hole 152 in apply pin 132. Another pressurized chamber 136, which is formed between the reaction piston 140 and the transmission case 22, is connected through slot 157 and recess 156 with the feed port 162 receiving always the same pressurized oil as chamber 135.

It should be noted that when the chamber 135 is pressure charged, the hydraulic forces acting on the apply piston 130 and the reaction piston 140 are equal and opposite. These forces clamp the band over the brake drum. The force exerted by the pressurized oil in chamber 136 on the reaction piston holds the band in regulating position, whenever the self-synchronizing band is set in the one-way mode.

Figure 6:
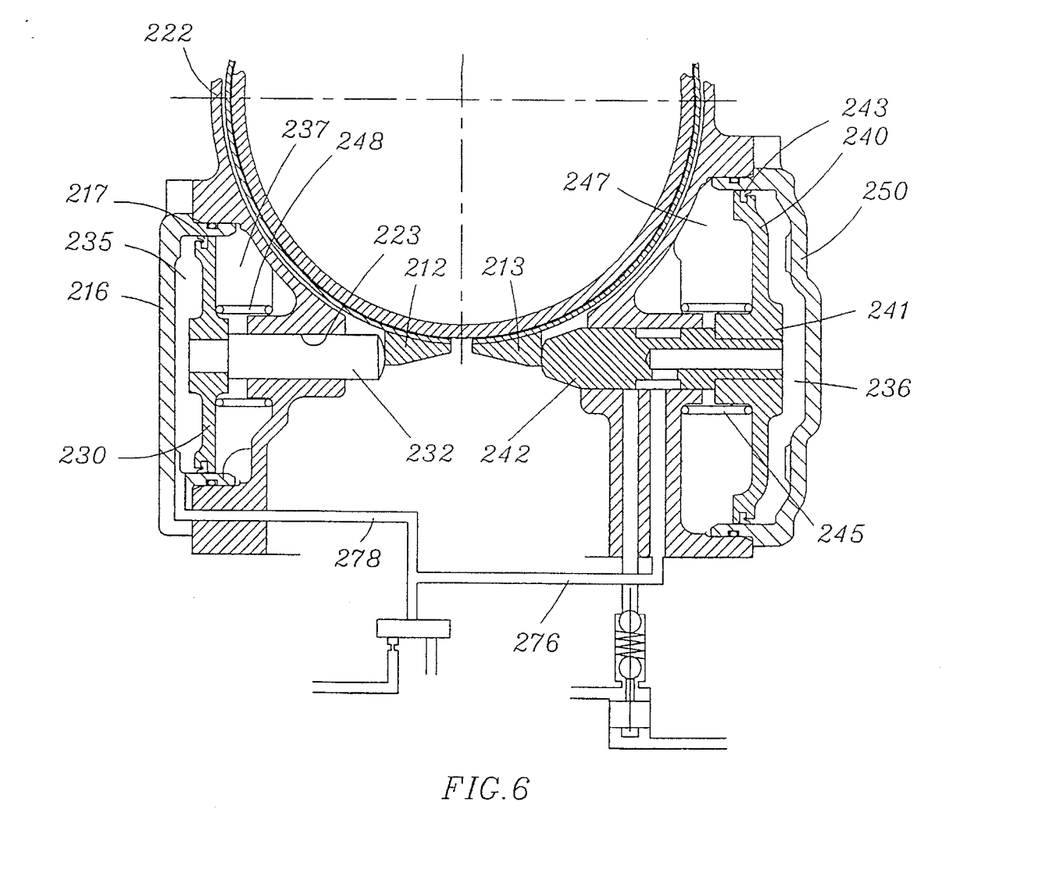
FIG. 6 is a view similar to FIGS. 2 and 5 illustrating another preferred embodiment of this invention, where the apply and reaction pistons are disposed on the opposing sides of the transmission.

In a third arrangement, shown in FIG. 6, the pistons are placed on opposite sides of the transmission, facing each other. An apply piston 230, having a seal 217 on its outer periphery and a pressed-in forward extending piston pin 232 slidably disposed in hole 223 in the transmission case 222. A compression spring 248, acting inside an exhausted chamber 237 formed between piston the 230 and the transmission case 222, returns the apply piston to a retracted position against a servo cover 216. When the chamber 235, formed between apply piston 230 and servo cover 217, is charged with pressurized oil from the control system delivered through feed passage 278, the apply piston 230 will start pushing on friction band end lug 212.

The reaction piston 240 consists of a piston 241, provided with a seal 243 on its outer periphery, and a piston pin 242, which also functions as the regulating valve for controlling the pressure in the two interconnected piston chambers 235 and 236. The reaction piston chamber 236 is formed in the interspace between reaction piston 240 and a servo cover 250 and receives its oil from the passage 276. When the chamber 236, formed between apply piston 240 and servo cover 250, is charged with pressurized oil from the control system delivered through feed passage 276, the apply piston 240 will start pushing on friction band end lug 212. A return spring 245 for piston 240 is disposed in a exhausted chamber 247 formed between piston 240 and transmission case 222.

The general operating principles of the control system for this arrangement are the same as for the systems for the embodiments described before.

Figure 7:
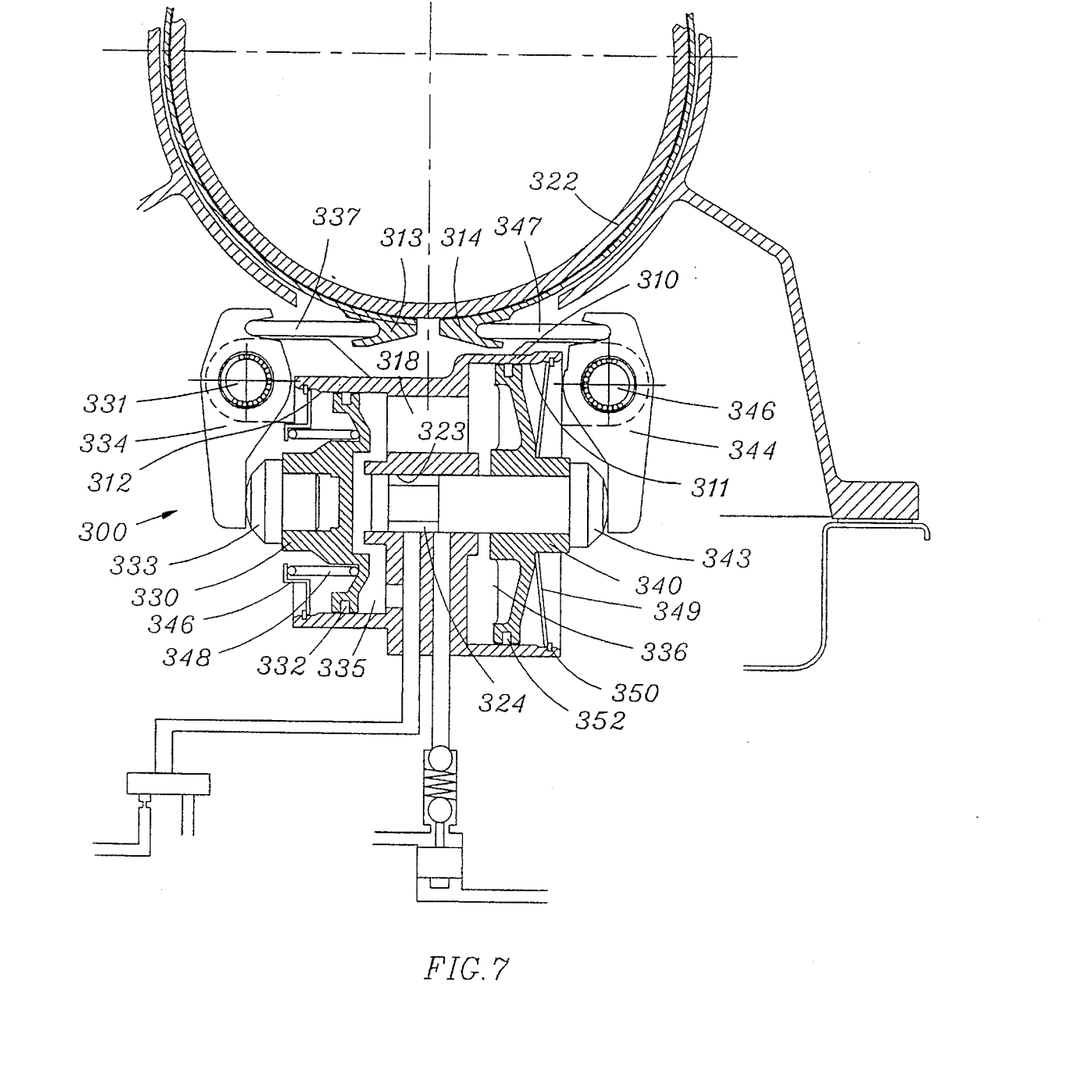
FIG. 7 in a view similar to FIG. 2 illustrating another modification of the invention with a multiplier lever and a strut are interdisposed between the piston and the friction band end lug.

Another arrangement, again functionally identical to the preceding arrangements, is shown in FIG. 7. This actuating system 300 has an apply piston 330 and a reaction piston 340, which are slidably disposed back-to-back in the actuator housing 310. Apply piston 330 has an oil ring 332 on its outer periphery slidably engaging with bore 312 for sealing chamber 335 formed between piston 330 and piston housing 310. It has a pressed-in button 333 on its front side providing a spherical hardened contact surface against a multiplier lever 334. Compression spring 348 is installed between retainer disk 346 and piston 330 to hold the piston retracted, when the band is disengaged.

The reaction piston 340 is slidably disposed in piston bore 311 in actuator housing 310. It has an oil seal 352 on its outside periphery for sealing chamber 336 formed between piston 340 and actuator housing 310. Diaphragm spring 349, retained by ring 350, is used to bias the reaction piston 340 in leftward direction. Piston 340 is pressed on guide pin 343, which is slidably disposed in a central bore 323 in piston housing 310. Included into the guide pin 343 is also a control function for the regulation of the charge pressure inside piston chambers 335 and 336, joined by opening 318 in the actuator housing 310. An orifice-restricted flow from the control system to these chambers also enters an annular recess 324 in the guide pin 343. Rightward movement of reaction piston 340 opens the recess to the exhaust passage 362 bleeding out oil, until the reaction force exerted by multiplier lever 344 and the hydraulic force are in balance.

Multiplier lever 334 on the apply piston side is mounted on a fulcrum pin 331 with needle bearings in the interspace for reducing friction at the highly loaded pivot point. Force from the lever 334 is transmitted to the apply end 313 of the brake band 322 by a strut 337. The reaction piston multiplier lever 344, mounted on fulcrum pin 346, is connected similarly with the other band end 314 through an interdisposed strut 347.

All previously described arrangements provide a brake band system that in locked mode holds torque in both directions and in one-way mode provides self-synchronized shifts in one specific direction. There are many applications where one brake band is used to provide the grounding means for the establishment of two separate gear ratios. A example of this is a four-speed transmission, where the same band is used to hold the second gear reaction torque in one direction and the overdrive fourth gear reaction torque in the opposite direction. The self-synchronizing feature provided by this invention is not needed in the fourth gear, since being the highest ratio there is no upshift from that gear.

The situation is different, if another overdrive gear ratio is added to convert said four-speed transmission into a five-speed transmission—the shift from fourth to the fifth gear will not be self-synchronous, unless another one-way brake device, working in opposite direction, is added for that purpose.

This can be avoided, however, by making the self-synchronized band operate bi-directionally, i.e. designing to provide freewheeler shifts selectably in either direction. One such arrangement, based on the embodiment shown in FIG. 6, is presented in FIG. 8a. Any of the preceding embodiments are readily convertible to function bi-directionally using technology described in the following.

Figure 8A:
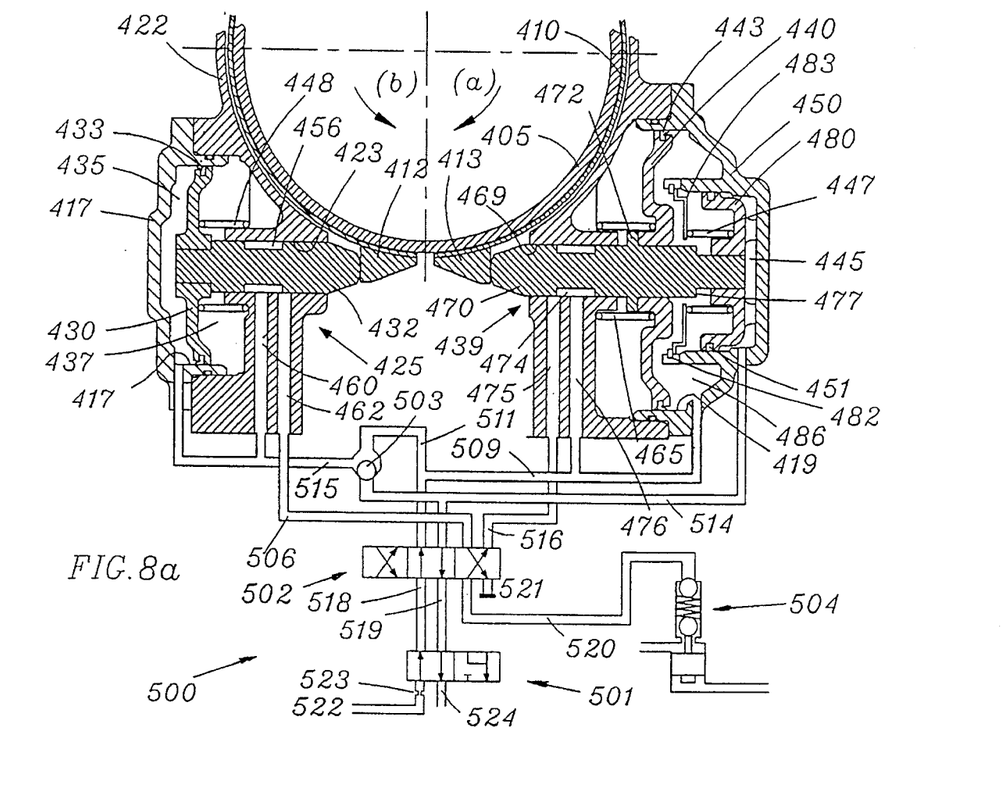
FIG. 8A and 8B is a view similar to the view of FIG. 6 illustrating another modification of the invention with a conversion of the FIG. 6 arrangement into a bi-directional friction band system.

For clarity, an assumption is made here that the bi-directional friction band system, shown by FIG. 8a, is used in an above-mentioned type of five-speed automatic transmission for establishing the second and fourth gear ratios. The system has two operating modes: the first for providing synchronous power-on 2-3 and 3-2 shifts in one direction, and the second for providing synchronous power-on 4-5 and 5-4 shifts in the opposite direction. These modes are referred to in the following as "second gear mode" and "fourth gear mode", respectively. The arrangement described is derived from the uni-directional arrangement shown in FIG. 6 by supplementing it with another, smaller piston and by revising its control system.

The system includes a first piston 430, which is pressed on or otherwise securely attached to the guide pin 432, which in turn is slidingly disposed in a bore 423 in the transmission case 422. First piston 430, having a lipseal 433 on its outer periphery and disposed operatively inside a bore 418 formed in the servo cover 417, is activated by pressurizing a chamber 435 formed between a servo cover 417 and piston 430. An annular slot 456 in guide pin 432, cooperating with ports 460 and 462 open to the bore 423, provides the exhaust control valve system 425 required for the power-on 4-5 and 5-4 shifts. Compression spring 448 returns the piston 430 to its retracted position, when the friction band is disengaged. When the band is applied, piston 430 will thrust forward against the end lug 412 of brake band 410.

The second piston 440, operative in second gear only, has a lipseal 443 on its outer periphery, which engages with bore 419 in a servo cover 450. Piston 440 is disposed slidably over a piston pin 470, which has integral collar 472 thereon for providing a surface for the piston 440 to thrust against. A helical compression spring 465 returns the second piston 440 to its retracted position in all gear ratio ranges other than the second gear.

In the fourth gear the band is engaged by activating a smaller third piston 480 also disposed in servo cover 450 behind second piston 440 and mounted slidably on the piston pin 470 which in turn is inserted in a bore 469 in transmission case 422. Third piston 480, having an annular seal 451 on its outer periphery, and forming a chamber 445 with servo cover 450, is returned to its retracted position by a compression spring 447, which is mounted operatively between said piston and the retainer plate 483 held in place by a snap ring 482. An annular slot 474 in piston pin 470, cooperating with ports 475 and 476 open to the bore 469, provides the exhaust control valve 439 required for the 2-3 and 3-2 power shifts.

Depending on the selected gear mode, either the second piston 440 thrusting on the collar 472 or the third piston 480 thrusting against shoulder 477 pushes the piston pin 470 against the band end lug 413.

Figure 8B:
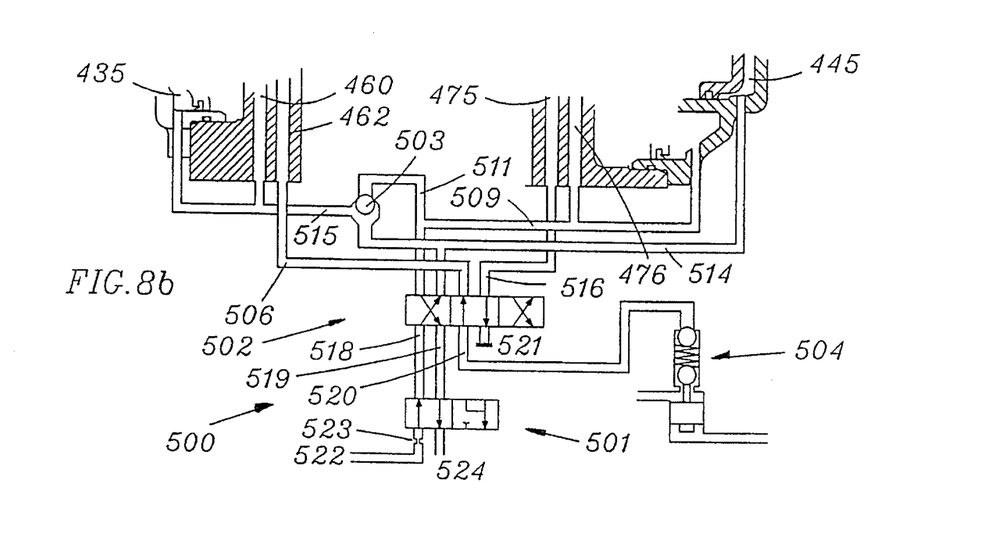

The associated control system 500 for this preferred embodiment is shown in FIG. 8a staged for the 2-3 and 3-2 power-on shifts, and in FIG. 8b staged for the 4-5 and 5-4 power-on shifts. The system is activated by a shift valve 501, which is here shown as a separate on-off valve, but may also integrate other control functions, as is commonly done in all automatic transmissions. With valve 501 in on-position, pressurized oil from supply line 522 passing through an orifice 523 is directed to passage 518. In this position valve 501 also connects passage 519 with an exhaust port 524. A 4-way shuttle valve 502 establishes the gear mode of the control system.

In the second gear mode, shown in FIG. 8a, oil flow continues from passage 518 to line 511, and further, through 2-way ball valve 503 and passage 515, to the feed port 460. In addition, the oil flow in line 511 also branches out to a passage 509 leading to the port 476 and further to chamber 486 formed between second piston 440, third piston 480 and servo cover 450. Chamber 445 is at this time exhausted through passage 514, valve 502, line 519, and further through exhaust port 524 in shift valve 501.

Oil from the exhaust port 475 flows through a passage 516 to the shuttle valve 502, which directs it to the passage 520 leading to the mode valve 504. Oil flow from the port 462 through passage 506 is blocked at the shuttle valve 502. Piston 480 is inactivated with feed passage 514 being connected with the exhausted passage 519.

The events during a second gear mode power upshift to the third gear ratio are basically the same as in the previously described first preferred embodiment shown in FIG. 2. In second gear the band reaction torque is acting in counter-clockwise direction as identified by an arrow (a) in FIG. 8a. With shuttle valve 502 in second gear mode position, and the chambers 435 and 486 charged with common pressurized oil, the first piston 430 is acting as the applying piston and the second piston 440 as the reactive piston. System is set in a lock mode with exhaust line 506 blocked at shuttle valve 502 and exhaust line 516 blocked at mode valve 504.

Initially, when the transmission is in the second gear with the brake band is engaged and the system in normal locked mode, both chambers 435 and 486 are charged with the supply pressure creating a hydraulic piston force that exceeds the brake band reaction force, thereby causing the second piston 440 move leftward against the transmission case 422.

Upon a 2-3 shift signal, the mode valve 504 is set in one-way mode. The annular recess 474 in piston pin 470, which is in communication with chambers 435 and 486, opens to exhaust port 475, thereby reducing the pressure present in said chambers. This starts the pressure regulating phase of the shift.

As the oncoming friction element gains in torque capacity, both the torque transmitted by the off-coming band 410 and the corresponding reaction force acting on piston pin 470 decrease, as illustrated in FIG. 4. During this phase the torque capacity of the band is linearly related to the torque carried by the band. Consequently, when the carried torque drops to zero, the torque capacity of the band also drops to a near-zero value making the drum 405 free to start turning in opposite direction. When the shift is completed shift valve 501 is moved to the off-position to prevent the band from dragging unnecessarily against the brake drum.

The events during a 3-2 power downshift with the bi-directional self-synchronizing band are the same as with previously described first preferred embodiment of a uni-directional band illustrated in FIG. 2. Briefly, the band is set in a one-way mode at the beginning of the shift to be ready to start carrying torque and lock up at the moment the off-coming friction is about to start slipping. The resulting shift is very similar to a downshift to a roller or sprag-type one-way clutch.

A transmission with a bi-directional self-synchronizing band as a second/fourth reaction brake can be shifted from third to fourth ratio range in either in second or in fourth gear mode. In the first instance the reaction torque is transferred to a higher torque capacity band operating in de-energized direction, and in the second instance to a lower capacity band operating in energized direction. If the 3-4 shift is made with the band set in second gear mode, the band should be switched to the fourth gear mode immediately to be sure that the system is ready for the following upshift to the fifth gear.

In the fourth gear mode, the shuttle valve 502 is positioned rightward as shown in FIG. 8b. The oil flow from the passage 518 is now directed to the passage 514 leading to chamber 445, where it activates the third piston 480. The ball-type two-way valve 503 allows the same oil also enter passage 515 leading to chamber 435 and the feed port. The pressurized oil in chamber 435 activates first piston 430, which in this mode functions as a reaction piston opposing the reactive force from the band 410 transmitted to the piston pin 430. The oil flow from the exhaust control port 462 enters the shuttle valve 502, where it is directed to the passage 520 leading to the mode valve 504. Chamber 486, associated with second piston 440, is exhausted through the lines 509 and 511, and through the shuttle valve 502 to the line 519 leading to the shift valve 501, where it is directed to the exhaust port 524.

With transmission in the fourth gear, where brake drum 405 is held grounded by brake band 410, the reaction force acting on the piston pin 432 in leftward direction is opposed by a hydraulic force first piston 430 is exerting on the piston pin 432. When the system is set in a one-way mode, the exhaust control valve 425 regulates the pressure acting on both pistons 430 and 480 in relationship with the torque carried by the brake band 410 in a manner described previously. Consequently, when during a 4-5 power-on upshift the on-coming friction device gains enough torque carrying capability to take over and the torque transmitted by the brake band 410 diminishes to zero, the torque capacity of the brake band has also dropped to a near-zero value thereby allowing the brake drum 405 freewheel in forward direction.

While only the preferred embodiments of this invention has been shown and described, other embodiments will now become apparent to those skilled in the art. Accordingly, this invention is not limited to that which is shown and described, but by what is claimed in the following.

What is claimed is:

1. A self-synchronizing brake band and a band control unit for the use in an automatic change gear ratio transmission having input and output means cooperating with a planetary gear unit with selectively engagable friction members to provide a plurality of transmission gear ratios, including a hydraulically operated clutch operable to condition the transmission for one gear ratio and a friction drum operatively connected to such said gear unit, said drum adapted to be frictionally engaged to condition the transmission for another gear ratio, a transmission case having a cavity formed therein, the improvement comprising a friction band with apply and reaction ends disposed at least partially around said drum for the selective frictional engagement with said drum, said band having a first abutment member at said apply end and having a second abutment member at said reaction end, a first piston operatively mounted for stroking movement in said cavity for effecting the frictional engagement of said band with said drum for establishing said another gear ratio, an elongated force transmitting member operatively disposed between said first piston and said first abutment member, a second piston operatively mounted in said cavity, an extension disposed between said second piston and said second abutment member and operative therebetween as a force transmitting member, a source of fluid pressure, fluid pressure chamber means for said first and second pistons, fluid conducting passages having an inlet port and a flow restricting means and an exhaust port, said inlet port leading between said chamber means and said source of fluid pressure, a fluid control system controlling the fluid pressure in said fluid pressure chamber means, said control system having a movable control valve element open to said inlet port for feeding pressure fluid through said flow restricting means into said fluid pressure chamber means, said control valve element being movable by varying brake band reaction force transmitted through said second abutment member to control and vary the degree of opening of said exhaust port and said chamber means to exhaust and thereby regulate the pressure of said fluid therein so that there is an increase in pressure in said chamber means when the transmitted torque of said band increases and a decrease in said pressure when the transmitted torque of said band decreases.

2. A self-synchronizing brake band and a band control unit for a change-speed ratio automatic transmission having input and output and planetary gearing operatively disposed between said input and output, a brake drum operatively connected to a member of said planetary gearing, a friction brake band associated with said drum and selectively engageable therewith for conditioning said planetary gearing and the transmission for one input/output ratio, said friction brake band having an apply end and a reaction end, a friction device separate from said brake band and associated with said planetary gearing and selectively engageable to condition said planetary gearing and said transmission for another input/output ratio and being conditionable to slip and to fully release said transmission for said another input/output ratio, a fluid pressure chamber means, an inlet port leading into said chamber means, a fluid flow restricting means associated with said inlet port, and an exhaust port leading from said chamber means, the improvement comprising a second piston operatively mounted in said chamber means and operatively connected to said reaction end of said band, a first piston operatively mounted in said chamber means and connected to said apply end of said band, a fluid pressure control system for controlling fluid pressure in said chamber means acting on said first and second pistons, said inlet port being operable for feeding pressure fluid through said flow restricting means into said chamber means, said control system having a valve member operatively connected to said reaction end of said band so that on power upshifts said valve member moves to progressively open said exhaust port to regulate the fluid pressure in said chamber means to obtain a smooth transfer of torque from said band to said friction device, and so that on power downshifts said valve member moves to block the flow through said exhaust port to build up pressure in said chamber means for rapid engagement of said band when said friction device being released starts slipping.

3. The brake band and control unit of claim 2, and further including a transmission case for said brake band and control unit and wherein said first piston has an elongated and centralized pin extending therefrom into engagement with said apply end of said band and wherein said second piston has an extension slidably receiving said centralized pin of said first piston, said extension operatively engaged with said reaction end of said band, said extension slidably mounted in said transmission case and cooperating with said centralized pin and said case to define control valving to establish a fluid pressure control system for said first and second pistons.

4. A self-synchronizing brake band device and an operating system therefor for employment in an automatic change speed ratio transmission having input and output means input and output means and conditionable for at least higher and lower gear ratios driving modes and for coasting modes and comprising a planetary gear unit at least one reaction member associated with said gear unit to provide plurality of gear ratios, a hydraulically operated clutch for establishing one gear ratio by locking said gear unit, a brake drum connected to a reaction member of said planetary gear unit member adapted to be held stationary to obtain another gear ratio,     a transmission case including a transversely extending portion defining a pressurizable cavity, first and second piston means operatively mounted for stroking movement in said cavity,     a brake band selectively engagable with said brake drum for holding said brake drum stationary, said band having first and second end lugs attached thereto,     said first piston means operatively mounted in said cavity for effecting engagement of said brake band with said drum in response to pressurization of said cavity and the resultant stroking of said first piston means therein,     a piston pin operative as a force transmitting member disposed between said first piston means and said first end lug,     second piston means operatively mounted for movement in said cavity of said casing, said second piston means having a forward extending guide rod movably mounted in casing to receive a torque related reactive force from said band as transmitted thereto through said second end lug, said reactive force from said band being counteracted by a hydraulic force exerted on said second piston means by the same fluid pressurizing said first piston means,     an exhaust control valve means comprising a fluid recess formed on said guide rod, first port means for feeding pressure fluid into said cavity through said fluid recess, and second port means for providing controlled exhausting of fluid from said cavity,     said second port means having an opening that varies in extent and fluid flow capacity in accordance with moved positions of said second piston and said guide rod in said casing resulting in regulation of the pressure of said fluid in said cavity acting on said second piston in response to the opposing reactive band forces from said second end lug exerted on said second piston means, to effect an increase in said pressure of said fluid when the transmitted torque of said band increases and a decrease in said pressure of said fluid when the transmitted torque of said band decreases.

5. The self-synchronizing brake band device and operating system of claim 4, wherein said exhaust control system is operable to control the torque capacity of said band in proportion to the torque that said brake band is carrying such that during an upshift to a higher gear ratio said on-coming hydraulically operated clutch has gained sufficient capacity to carry the input torque and the torque transmitted by said self-synchronizing brake band reduces to zero and is about to reverse, said brake band resultantly becomes disengaged from said brake drum allowing it to freewheel and thereby act in a manner of a one-way roller coupling device by holding torque in one direction and freewheeling in the opposite direction.

6. The self-synchronizing brake band device and operating system of claim 4 and further comprising a pressure control valve in communication with said second port of said exhaust control valve for regulating a low tickling pressure to act on said first and second pistons thereby producing a low drag torque between said band device and brake drum for initiating a power-on downshift from a higher ratio to a lower ratio and for re-engaging said brake band when said transmission after changing from a driving mode to a coasting mode again returns back to the driving mode.

7. The self-synchronizing brake band device and operating system of claim 6 and further including a mode valve having a valve element operative for selectively blocking flow from the second port of said exhaust control valve and thereby setting the control system in a locked mode so that said friction brake band provides engine braking by holding torque in both rotational directions and for selectively permitting a free through-flow from said second port and thereby setting the operating system in a one-way mode whereby said brake band device is capable of holding torque only in one direction and freewheeling in opposite direction.

8. The self-synchronizing brake band device and operating system of claim 7, wherein said operating system is normally set for operating in said lock mode said operating system is set for operating in said one-way mode when a downshift is signaled and low drag torque is established between said brake drum and said brake band, so that said brake drum starts turning in opposite direction at the end of the torque phase of a shift to drag said brake band therealong thereby causing said second piston move axially to block fluid from flowing through said exhaust control valve resultantly causing a rapid rise of pressure acting on said first and second pistons and a resulting instantaneous engagement of said brake band and said brake drum.

9. A self-synchronizing brake band device and operating system defined in claim 4 further characterized in that said second piston means comprises an assembly of two cooperating piston members including a first cup-shaped open-ended piston member having an annular seal on its outer periphery and a second disk-shaped piston member sealingly attached to said cup-shaped piston member at the open end thereof to enclose said first piston means inside said assembly at piston members and forming a first chamber between said first piston means and said disk-shaped piston member, a second chamber formed between said cup-shaped piston member and said transmission case, said first and second chambers being hydraulically connected with one another, said piston assembly being operative in response to counteracting reaction forces exerted by said brake band on said reaction piston to displace said reaction piston and modulate the supply pressure applied to said second piston.

10. A self-synchronizing brake band device and operating system defined in claim 4 wherein said first and second piston means cooperatively interact for effecting engagement of said brake band with said drum and wherein said brake band and operating system is characterized in that said first piston means and said second piston means are operatively mounted in opposite sides of said transmission case and face one another facing each other, and said control valve means is associated with said second piston means.

11. A self-synchronizing brake band device and operating system defined in claim 4, and further comprising separate lever means operative at each end of said brake band, separate fulcrum means and separate strut means for each of said separate lever means, said first and second pistons having a common pressure chamber, a piston housing attached to said case, a separate apply pin for each of said pistons and operative on said lever means associated therewith and pivoting on said fulcrum means, one said strut means being disposed between a first said lever means and a first of said band end lugs to transmit force from said first piston means to said band end lug for engaging said brake band, said exhaust control valve means being incorporated into one of said apply pins to regulate pressure in said pressure chamber according to the torque carried by said brake band device.

12. The self-synchronizing brake band device and operating system defined in claim 6, and being characterized by discrete fully open, fully locked and one-way modes of operation, said pressure acting on said first piston means being controlled by said exhaust control valve for conditioning said band to engage said drum and hold torque in a first direction, and to release said drum so that said drum can freewheel in a second direction opposite to said first direction thereby effecting freewheeler type shifts in said first direction of torque, further having a third piston means and second exhaust control valve means operative for providing freewheeler shifts in said second direction by pressurizing said first and third pistons, said third piston means being operative for providing an apply force for said band and said first piston counteracting reaction forces from said band, said second exhaust control valve means operative for regulating pressure acting on said first and said third pistons such that torque capacity of said brake band remains proportional to the torque carried by said band in said second direction, said brake band resultantly becoming capable of providing freewheeler type shifts selectably in either direction of torque.

13. In an automatic transmission having an input and an output, a change ratio planetary gear unit operatively connected between said input and said output to provide a plurality of input/output gear ratios, a first hydraulically operated friction device operatively connected to said gear unit selectively engagable to establish one of said gear ratios, a second hydraulically operated friction device operatively connected to said gear unit selectively engagable for establishing another of said gear ratios, said second friction device comprising a rotatable friction drum having a friction surface and having operative connection to said gear unit, a brake band associated with said drum and selectively engagable with said friction surface thereof to retard rotation of said drum and thereby condition said gear unit for said another of said gear ratios, said band having an apply end and a reaction end, a servo housing, a hydraulically operated apply piston operatively mounted in said chamber housing to define an apply chamber therein, a first force transmitting member operatively connected between said apply piston to said apply end of said band, a hydraulically operated reaction piston operatively mounted in said housing and defining a reaction piston chamber therein, a second force transmitting member operatively connected between said reaction piston to said reaction end of said band, a hydraulic fluid supply passage for conducting pressurized hydraulic fluid to said chambers, an exhaust port for conducting hydraulic fluid from said chambers, a hydraulic fluid pressure source, an exhaust control valve operatively associated with at least one of said force transmitting members and movable therewith to progressively control the opening of said exhaust port, and a mode valve having a fluid exhaust associated therewith and being operatively connected to said exhaust port and having a valve member movable in response to the engagement of said first friction device to open said exhaust port to said fluid exhaust so that said exhaust control valve lowers the pressure in both of said piston chambers and the torque transmitted by the clutch progressively builds up and the torque carried by the band progressively decreases.

\* \* \* \* \*